(12) United States Patent
Aznaurashvili et al.

(10) Patent No.: US 10,796,376 B2
(45) Date of Patent: Oct. 6, 2020

(54) AUTOMATIC EXCHANGE OF INFORMATION FOR VEHICLE ACCIDENTS

(71) Applicant: Capital One Services, LLC, McLean, VA (US)

(72) Inventors: Zviad Aznaurashvili, McLean, VA (US); Hannes Jouhikainen, McLean, VA (US); Steve Blanchet, Alexandria, VA (US); Timur Sherif, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 33 days.

(21) Appl. No.: 16/053,529

(22) Filed: Aug. 2, 2018

(65) Prior Publication Data
US 2020/0043097 A1 Feb. 6, 2020

(51) Int. Cl.
*G06Q 40/08* (2012.01)
*G06Q 50/26* (2012.01)

(52) U.S. Cl.
CPC .......... *G06Q 40/08* (2013.01); *G06Q 50/265* (2013.01)

(58) Field of Classification Search
CPC ....... G06Q 40/00; G06Q 40/08; G06Q 50/265
USPC .......................................................... 705/4
See application file for complete search history.

(56) References Cited

U.S. PATENT DOCUMENTS

| | | | | |
|---|---|---|---|---|
| 6,584,467 B1* | 6/2003 | Haught | ............ | G06Q 40/08 |
| 8,799,034 B1* | 8/2014 | Brandmaier | ............ | G07C 5/008 |
| | | | | 705/4 |
| 9,019,092 B1* | 4/2015 | Brandmaier | ............ | B60R 25/102 |
| | | | | 340/426.1 |
| 2002/0195490 A1* | 12/2002 | Gehlot | ............ | B60R 13/10 |
| | | | | 235/384 |
| 2003/0112133 A1* | 6/2003 | Webb | ............ | G07C 5/085 |
| | | | | 340/436 |
| 2003/0233261 A1* | 12/2003 | Kawahara | ............ | G06Q 10/10 |
| | | | | 705/4 |
| 2004/0088090 A1* | 5/2004 | Wee | ............ | G08G 1/205 |
| | | | | 701/33.4 |
| 2005/0278082 A1* | 12/2005 | Weekes | ............ | G07C 5/008 |
| | | | | 701/1 |

(Continued)

OTHER PUBLICATIONS

"Automated Collision Notification Field Operational Test[FOT]"—Final Report. NHTSA. dated Oct. 31, 2000.*

(Continued)

*Primary Examiner* — Hani M Kazimi
(74) *Attorney, Agent, or Firm* — Harrity & Harrity, LLP

(57) ABSTRACT

A server device may receive, from a first user device, a first set of information regarding a first accident involving a first vehicle, and from a second user device, a second set of information regarding a second accident involving a second vehicle. The first user device may relate to a first user associated with a first policy issued by a first policy provider. The second user device may relate to a second user associated with a second policy issued by a second policy provider. The server device may determine that the first accident corresponds to the second accident, obtain first policy data relating to the first policy, and second policy data relating to the second policy, and cause the first policy data to be provided to the second user device, and the second policy data to be provided to the first user device.

20 Claims, 9 Drawing Sheets

(56) References Cited

U.S. PATENT DOCUMENTS

| | | | | |
|---|---|---|---|---|
| 2006/0199612 A1* | 9/2006 | Beyer, Jr. | .......... | H04M 1/72572 455/556.2 |
| 2006/0226960 A1* | 10/2006 | Pisz | .................... | G08B 25/001 340/425.5 |
| 2008/0242261 A1* | 10/2008 | Shimanuki | ............ | H04W 76/50 455/404.2 |
| 2009/0106052 A1* | 4/2009 | Moldovan | ............... | G06Q 20/10 705/4 |
| 2010/0138242 A1* | 6/2010 | Ferrick | .................. | G06Q 40/00 705/4 |
| 2012/0028680 A1* | 2/2012 | Breed | ................... | B60N 2/0232 455/556.1 |
| 2012/0259665 A1* | 10/2012 | Pandhi | .................... | G06Q 40/00 705/4 |
| 2013/0006469 A1* | 1/2013 | Green | ..................... | G07C 5/008 701/36 |
| 2013/0006674 A1* | 1/2013 | Bowne | .................... | H04W 4/40 705/4 |
| 2013/0300552 A1* | 11/2013 | Chang | ...................... | B60Q 9/00 340/436 |
| 2014/0375446 A1* | 12/2014 | Wanami | ................. | G07C 5/0891 340/436 |
| 2015/0058045 A1* | 2/2015 | Santora | .................. | G08G 1/162 705/4 |
| 2015/0319297 A1* | 11/2015 | Beyer, Jr. | .............. | H04L 61/605 455/456.6 |
| 2015/0342542 A1* | 12/2015 | An | ..................... | A61B 5/02055 455/404.2 |
| 2016/0272140 A1* | 9/2016 | Kim | ........................ | H04M 11/04 |
| 2016/0357188 A1* | 12/2016 | Ansari | ................. | G05D 1/0212 |
| 2016/0358467 A1* | 12/2016 | Jeong | ...................... | H04W 4/40 |
| 2017/0053461 A1* | 2/2017 | Pal | ........................ | H04W 4/029 |
| 2017/0210323 A1* | 7/2017 | Cordova | ............. | G08G 1/0133 |
| 2018/0061151 A1* | 3/2018 | Chainer | ............... | G07C 5/0841 |
| 2018/0308344 A1* | 10/2018 | Ravindranath | ...... | G08B 27/001 |
| 2019/0043273 A1* | 2/2019 | Cordova | ............. | G07C 5/0816 |
| 2019/0210548 A1* | 7/2019 | Levy | ................... | B60R 21/0134 |
| 2019/0299822 A1* | 10/2019 | Garrido | .................. | G01S 19/13 |
| 2019/0349462 A1* | 11/2019 | Cordova | ........... | H04M 1/72538 |

OTHER PUBLICATIONS

Bruce R. Donnelly, "The Automated Collision Notification System." NHTSA. Retrieved from on Nov. 12, 2013.*

"Using Smartphones to Detect Car Accidents and Provide Situational Awareness to Emergency Responders." Mobile Wireless Middleware, Operating Systems, and Applications, pp. 29-42. Jul. 2010.*

* cited by examiner

AUTOMATIC EXCHANGE OF INFORMATION FOR VEHICLE ACCIDENTS

BACKGROUND

Many jurisdictions require drivers to obtain insurance coverage for vehicles before the vehicles may be operated. Typical insurance policies provide financial protection against vehicle damage or bodily injury in the event of an accident.

SUMMARY

According to some possible implementations, a method may include receiving, in substantially real-time, from a first user device, a first set of information regarding a first accident involving a first vehicle, and from a second user device, a second set of information regarding a second accident involving a second vehicle. The first user device may relate to a first user. The first user may be associated with a first policy. The second user device may relate to a second user. The second user may be associated with a second policy. The method may include determining that the first accident corresponds to the second accident based on the first set of information and the second set of information, obtaining first policy data relating to the first policy, and second policy data relating to the second policy, based on determining that the first accident corresponds to the second accident, causing the first policy data to be provided to the second user device, and the second policy data to be provided to the first user device, after obtaining the first policy data and the second policy data.

According to some possible implementations, a server device may include one or more memories and one or more processors, communicatively coupled to the one or more memories, configured to receive, in substantially real-time, from a first user device, a first set of information regarding a first accident involving a first vehicle, and from a second user device, a second set of information regarding a second accident involving a second vehicle. The first user device may relate to a first user. The first user may be associated with a first policy issued by a first policy provider. The second user device may relate to a second user. The second user may be associated with a second policy issued by a second policy provider. The second policy provider may be different from the first policy provider. The one or more processors may be configured to determine that the first accident corresponds to the second accident based on the first set of information and the second set of information, obtain first policy data relating to the first policy, and second policy data relating to the second policy, after determining that the first accident corresponds to the second accident, and cause the first policy data to be provided to the second user device, and the second policy data to be provided to the first user device, based on obtaining the first policy data and the second policy data.

According to some possible implementations, a non-transitory computer-readable medium may store instructions. The instructions may include one or more instructions that, when executed by one or more processors of a server device, cause the one or more processors to receive, in substantially real-time, from a first user device, a first set of information regarding a first accident involving a first vehicle, and from a second user device, a second set of information regarding a second accident involving a second vehicle. The first user device may relate to a first user. The first user may be associated with a first policy issued by a policy provider. The second user device may relate to a second user. The second user may be associated with a second policy issued by the policy provider. The instructions may include one or more instructions that, when executed by the one or more processors, cause the one or more processors to determine that the first accident corresponds to the second accident based on the first set of information and the second set of information, obtain first policy data relating to the first policy, and second policy data relating to the second policy, after determining that the first accident corresponds to the second accident, and cause the first policy data to be provided to the second user device, and the second policy data to be provided to the first user device, based on obtaining the first policy data and the second policy data.

DETAILED DESCRIPTION

Figure 1A:
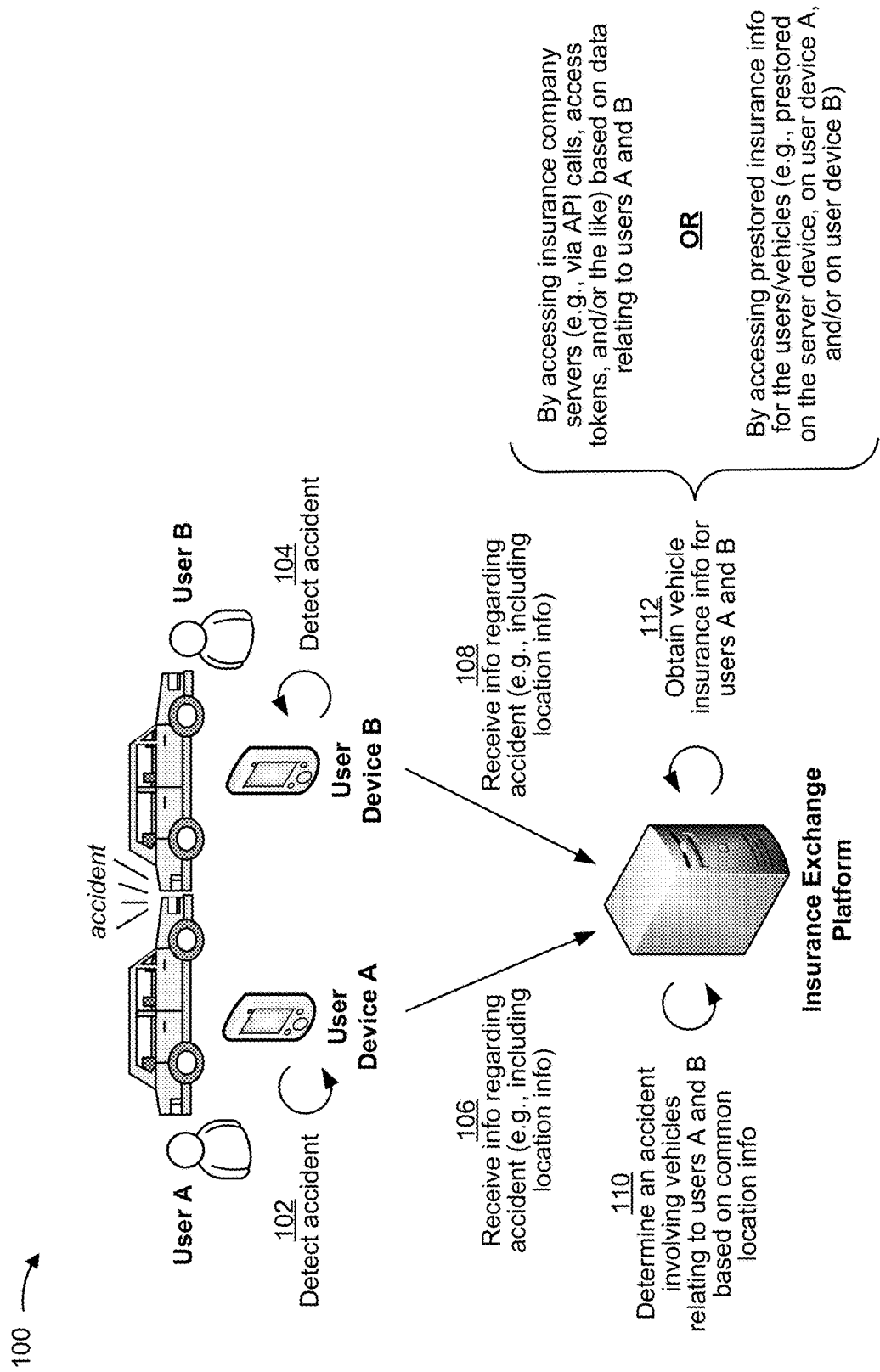
FIGS. 1A-1D are diagrams of an example implementation described herein.

The following detailed description of example implementations refers to the accompanying drawings. The same reference numbers in different drawings may identify the same or similar elements.

In most vehicle accidents involving two or more parties, the drivers of the vehicles exchange information with one another in order to submit claims to the drivers' respective insurance providers. This usually involves each driver obtaining, from the other driver, the other driver's name, address, phone number, insurance provider name, insurance policy number, driver license information, and/or the like. However, depending on a driver's experience in dealing with an accident, and the severity of the accident, the driver may not know or remember to obtain the above-mentioned information from the other driver. Furthermore, there is also a possibility that a party to an accident may provide false or invalid information (e.g., false insurance policy information, false driver's license information, and/or the like), which the other party may not able to readily verify, and even situations where no information is ever exchanged, such as in hit-and-run cases.

Some implementations, described herein, provide an information exchange platform that is capable of automatically facilitating an exchange of information (e.g., personal information, vehicle information, insurance policy data, and/or the like). In some implementations, an example information exchange platform may be utilized between parties in any situation that may benefit from a trusted exchange of information.

In some implementations, an exchange of information may be between parties involved in an accident, such as a vehicle collision. In such implementations, the information exchange platform may be referred to as an insurance exchange platform. In some implementations, the insurance exchange platform may automatically initiate the exchange of information based on data (e.g., motion sensor data) provided by one or more user devices (e.g., mobile device(s) and/or the like) of those involved in an accident. In some implementations, the insurance exchange platform may interact with multiple devices, including, for example, the user devices, server devices associated with insurance policy providers, server devices associated with third-party service providers, and/or the like, to determine whether an accident has occurred, to obtain insurance policy data associated with each of the parties, to perform the exchange of information, and/or to initiate insurance claims for one or more of the parties.

In this way, a platform that facilitates a trusted exchange of information may assist a user in obtaining needed information in a variety of situations. For example, in the event of an accident, an insurance exchange platform may assist a user in obtaining insurance information, which reduces or eliminates a need for the user to know or remember to obtain such information, especially when the user may be experiencing stress or anxiety from the accident. In addition, having a trusted, insurance exchange platform serve as an intermediary between parties to an accident gives confidence to each party that information, such as insurance policy data, obtained regarding the other party is valid and/or up-to-date. This avoids a need for a party to contact law enforcement authorities, to contact the other party's insurance provider, and/or the like to verify the information, which conserves network resources and time.

Figure 1B:
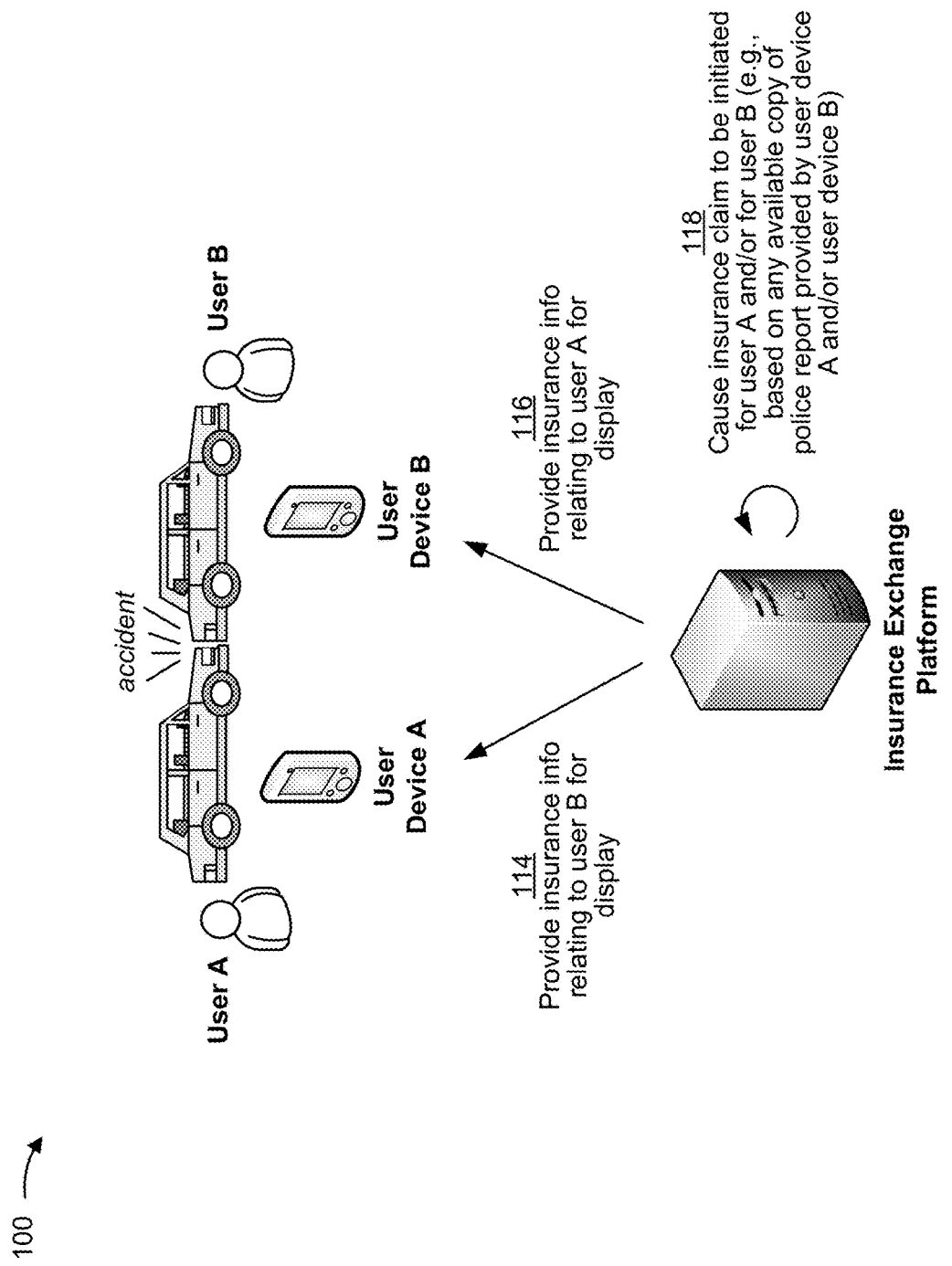

FIGS. 1A-1D are diagrams of an example implementation 100 described herein. As shown in FIGS. 1A and 1B, example implementation 100 may include an insurance exchange platform in communication with one or more user devices—here, a user device A associated with a user A, and a user device B associated with a user B. The insurance exchange platform may be configured to automatically facilitate an exchange of information (e.g., between users A and B) in the event of an accident (e.g., involving a vehicle relating to user A and a vehicle relating to user B).

In some implementations, the insurance exchange platform may be associated with, or managed by, an entity that is trusted by users of the user devices. For example, the trusted entity may include a financial institution, such as a bank and/or the like. In some implementations, the trusted entity may provide one or more applications for use by a user device, such as user device A and/or user device B, that enable the user device (and thus the associated user) to communicate and/or interact with the insurance exchange platform.

In some implementations, the insurance exchange platform may be associated with, or managed by, an insurance provider. In some implementations, the insurance provider may provide one or more applications for use by a policyholder's user device, such as user device A and/or user device B, that enable the user device to communicate and/or interact with the insurance exchange platform. In a case where both user A and user B hold insurance policies issued by the insurance provider, and are involved in an accident with one another, the insurance provider may automatically facilitate, via the insurance exchange platform, the exchange of information between users A and B as needed.

In some implementations, a third-party service provider may register, or become affiliated, with the insurance exchange platform, and may provide one or more applications (e.g., a map-based application, a traffic-based application, and/or the like) for use by a user device, such as user device A and/or user device B, that enable the user device to communicate and/or interact with the insurance exchange platform.

As shown in FIG. 1A, and as shown by reference number 102, user device A may detect data that is indicative of an accident. As shown by reference number 104, user device B may also detect data that is indicative of an accident. In some implementations, each of user device A and user device B may include one or more motion sensors (e.g., accelerometers, gyroscopes, and/or the like) configured to generate sensor signals based on movements of the user device, and may (e.g., via one or more applications implemented in hardware and/or software) analyze the sensor signals (e.g., for movements associated with rapid deceleration, and/or the like) to determine whether an accident has occurred or has likely occurred. In some implementations, each of user device A and user device B may additionally include one or more location-based sensors (e.g., global positioning system (GPS) sensor(s)) configured to determine a current location of the user device.

As shown by reference number 106, the insurance exchange platform may receive (e.g., in real-time, or substantially real-time) information regarding the accident from user device A, and, as shown by reference number 108, the insurance exchange platform may receive (e.g., in real-time, or substantially real-time) information regarding the accident from user device B. In some implementations, the information regarding the accident, received from user device A, may include information regarding the movements detected by the motion sensor(s) of user device A, information regarding a current location of user device A, and/or the like, and the information regarding the accident, received from user device B, may include information regarding the movements detected by the motion sensor(s) of user device B, information regarding a current location of user device B, information indicating a date and/or time of the accident, and/or the like.

In some implementations, user device A may, based on determining that an accident has occurred or has likely occurred, present a prompt (e.g., on a display, audibly, and/or the like) for user confirmation as to whether an accident did indeed occur. In a case where a user of user device A (e.g., user A) responds to the prompt with an input indicating that an accident did indeed occur, user device A may provide the information regarding the accident to the insurance exchange platform. In some implementations, user device B may similarly present a prompt for user confirmation, and similarly provide the information regarding the accident to the insurance exchange platform. In some implementations, the insurance exchange platform may, based on a user confirming that an accident did indeed occur, cause the user device to present a prompt requesting whether the user would like to contact emergency responders for assistance. In a case where the user responds to the prompt with an indication that the user would like to contact emergency responders, the insurance exchange platform may cause emergency responders to be contacted accordingly.

As shown by reference number 110, the insurance exchange platform may determine an occurrence of an accident, involving vehicles relating to user A and user B, based on the information received from user device A and user device B. For example, the insurance exchange platform may determine that user A and user B are involved in the accident based on the current location of user device A corresponding to (e.g., matching or closely matching) the current location of user device B.

In some implementations, and to more accurately determine, or confirm, whether the information regarding movements detected by the motion sensor(s) of user device A and/or the information regarding movements detected by the motion sensor(s) of user device B are indicative of an accident, the insurance exchange platform may perform an analysis of the information and/or forward the information to a third-party entity or system (e.g., a third-party platform or server device), with expertise in accident detection, for further analysis. In a case where the third-party system determines, based on the information, that an accident has occurred, the insurance exchange platform may receive a notification regarding the determination from the third-party system, and facilitate an exchange of information between user A and user B accordingly (e.g., as described in more detail below). Additionally, or alternatively, user device A may provide the information, regarding movements detected by the motion sensor(s) of user device A, directly to the third-party system, and user device B may similarly provide the information, regarding movements detected by the motion sensor(s) of user device B, directly to the third-party system. In such cases, the insurance exchange platform may query, or poll, the third-party system to determine whether the third-party system has detected an accident involving any users associated with the insurance exchange provider, such as user A, user B, etc. In a case where the third-party system determines, based on the information received from user device A and user device B, that user A and user B are involved in an accident, the insurance exchange platform may receive a notification regarding the determination from the third-party system, and facilitate the exchange of information between user A and user B accordingly.

As shown by reference number 112, the insurance exchange platform may obtain user A's insurance information and user B's insurance information. For example, the insurance exchange platform may obtain insurance policy data relating to user A's vehicle and insurance policy data relating to user B's vehicle.

In some implementations, the insurance exchange platform may store user profile information for each user associated with the insurance exchange platform or registered to utilize services provided by the insurance exchange platform. In some implementations, each user may provide, to the insurance exchange platform (e.g., upon registration with the insurance exchange provider, upon request by the insurance exchange platform, after an accident has occurred, and/or the like), the user's insurance provider information that the insurance exchange platform may utilize to obtain the user's insurance policy data. For example, a user may provide a name of the user's insurance provider, the user's authentication credentials for accessing the user's insurance policy data on the insurance provider's server or platform, one or more access tokens for accessing the user's insurance policy data on the insurance provider's server or platform, and/or the like. In such cases, the insurance exchange platform may, for each user—e.g., here, user A and/or user B—associate the user's insurance provider information with the user's user profile, access the user's insurance provider server or platform using the insurance provider information, and obtain the user's insurance policy data from the user's insurance provider server or platform. Obtaining the user's insurance policy data directly from the user's insurance provider in such a manner ensures that the user's insurance policy is valid and/or up-to-date. In some implementations, the insurance exchange platform may, upon or after obtaining a user's insurance policy data, store the insurance policy data in the user's profile for future use as needed. In some implementations, each user may additionally provide, to the insurance exchange platform, the user's contact information or vehicle-related information, including, for example, the user's name, the user's address, the user's phone number, the user's e-mail address, license plate numbers of the user's vehicle(s), and/or the like, which the insurance exchange platform may associate with the user's user profile.

In some implementations, the insurance exchange platform may obtain each user's insurance policy data directly from the user's user device. For example, in a case where a user has previously downloaded the user's insurance policy data onto the user's user device, and stored the insurance policy data in memory on the user device (e.g., the user's insurance provider may have provisioned the user's insurance policy data onto the user device, thus ensuring validity and reliability of the insurance policy data), the insurance exchange platform may submit a request, to the user device, for the insurance policy data, and receive the insurance policy data from the user device based on the request.

Additionally, or alternatively, the insurance exchange platform may instruct a user device to display a prompt requesting a user of the user device to manually input the user's insurance policy data. In such cases, the insurance exchange platform may obtain the user's insurance policy data based on the user's input.

As shown in FIG. 1B, and as shown by reference number 114, the insurance exchange platform may provide user B's information (e.g., contact information, insurance policy data, and/or the like) to user device A for display. As shown by reference number 116, the insurance exchange platform may provide user A's information (e.g., contact information, insurance policy data, and/or the like) to user device B for display. In some implementations, the insurance exchange platform may limit the information that is exchanged between users to only the information that each user may need to submit an insurance claim.

In some implementations, the insurance exchange platform may not directly provide a user's information to another user. For example, the insurance exchange platform may instead cause a first user's information (e.g., user A's information) (e.g., contact information, insurance policy data, and/or the like) to be stored in memory, and may provide a resource identifier (e.g., a secure link, such as a uniform resource identifier (URI), a secure token, and/or the like), usable to access the first user's information in the memory, to a user device of a second user (e.g., user device B of user B), which the second user may use to access the first user's information.

In this way, parties to an accident may gain access to one another's information, without having to perform any of the traditional actions needed to exchange information after an accident.

In some implementations, the insurance exchange platform may, after or upon obtaining a user's information (e.g., contact information, insurance policy data, and/or the like), cause the user's information, and/or a resource identifier (e.g., a secure link, such as a uniform resource identifier (URI), a secure token, and/or the like) usable to access the user's information, to be provided to the user's user device. In such cases, the user's user device may communicate (e.g., via Bluetooth, a near field communication (NFC) protocol, and/or the like) the user's information and/or the resource identifier (e.g., based on an instruction provided by the insurance exchange platform, based on a user input, based on detection of an accident, and/or the like) to one or more other user devices of one or more other parties to enable such parties to securely access the user's information. Tokenizing user information, for example, via the use of a resource identifier, is particularly beneficial, since parties do not have to manually exchange any user information, and a user's information may be obscured from other parties, while being made available to the insurance exchange platform.

In some implementations, the insurance exchange platform may not exchange user information (and/or associated resource identifiers) directly between parties of an accident, but may rather provide such information (and/or associated resource identifiers) to the parties' insurance providers for claims processing.

In some implementations, the insurance exchange platform, or an associated application on a user device (e.g., the above-described application provided by the trusted entity and/or the like) may be configured to encode a user's information (e.g., contact information, insurance policy data, and/or the like), and enable the user to share the encoded information with others (e.g., via quick response (QR) code capturing, near-field communication (NFC), Bluetooth-based communication, and/or the like). For example, in some implementations, the insurance exchange platform may submit (e.g., push) a request to a user device prompting a user of the user device to indicate whether the user permits the user's information to be shared, and may, based on the user's permission to share the user's information, encode the user's information, and provide the encoded information to the user's user device for sharing.

As shown by reference number 118, the insurance exchange platform may cause an insurance claim to be initiated for user A and/or user B. In some implementations, the insurance exchange platform may instruct user device A and/or user device B to prompt user A and/or user B to provide a copy of a police report (e.g., to capture one or more images of the police report), and cause an insurance claim to be initiated for user A and/or user B (e.g., by communicating with user A's insurance provider and/or by communicating with user B's insurance provider) based on the contents of the police report. Such contents may include, for example, the names, addresses, phone numbers, and/or the like of all drivers involved, all passengers present, and/or all witnesses to the accident, the names of insurance providers providing insurance coverage for the vehicles involved, any insurance policy numbers, a date and a time of the accident, a location of the accident, driver's license information for all drivers involved, information regarding a make, a model, and/or a year of each vehicle involved, license plate numbers of all vehicles involved, and/or the like. In some implementations, the insurance exchange platform may obtain relevant case numbers for user A and/or user B, and provide the case numbers to user device A and/or user device B for user reference.

In some implementations, the above-described application—e.g., provided by the trusted entity and installed on a user device (e.g., user device A and/or user device B)—may permit a user of the user device (e.g., user A or user B) to input and store the user's medical information, emergency contact information, and/or the like, so as to enable authorities (e.g., emergency responders and/or the like) to obtain such information in the event of an accident. In such cases, this information may be accessed, for example, by inputting a predefined code (e.g., a special code known only to emergency responders and/or the like) into the application to cause the user device to present the information, by submitting a request to the insurance exchange platform to instruct the application to cause the user device to present the information, and/or the like.

In some implementations, a user device (e.g., user device A and/or user device B) may be integrated into a vehicle, and may include, or be communicatively coupled to, various vehicle sensors configured to detect various conditions of the vehicle. Such conditions may include vehicle speed, braking of the vehicle, acceleration of the vehicle, tire pressure, wiper speed, user movement within the vehicle, and/or the like. In such cases, the user device and/or the insurance exchange platform may be configured to determine a severity of an accident, potential underlying causes of the accident (e.g., such as a tire being blown out, a driver interacting with a dashboard (and thus may have been distracted), windshield wipers operating at maximum speed (and thus may have negatively impacted driver visibility), and/or the like), and/or the like.

For example, the user device and/or the insurance exchange platform may determine a severity of an accident based on information regarding a deceleration of the user device and/or the vehicle. In a case where the information regarding a deceleration of the user device and/or the vehicle indicates that the user device and/or the vehicle decelerated at a rate that satisfies (e.g., exceeds) a threshold (e.g., decelerated from 70 miles per hour to 0 miles per hour within a short period of time), the user device and/or the insurance exchange platform may determine that a severity of the accident is high. In a case where the information regarding the deceleration of the user device and/or the vehicle indicates that the user device and/or the vehicle decelerated at a rate that does not satisfy (e.g., is less than) the threshold (e.g., decelerated from 5 miles per hour to 0 miles per hour within a short period of time), the user device and/or the insurance exchange platform may determine that the severity of the accident is low.

In some implementations, the insurance exchange platform may perform one or more actions based on the determined severity of an accident. As one example, the insurance exchange platform may facilitate an exchange of information between parties to an accident at a timing that is based on the severity of an accident. For example, in a case where the user device and/or the insurance exchange platform determines that the severity of an accident is high (and thus the user may not be in a position to interact with the user device or the insurance exchange platform), the insurance exchange platform may facilitate the exchange of information by sending the information to the user via e-mail, text message, and/or the like (e.g., in addition to, or rather than, causing the information (or an associated resource identifier) to be displayed on the user device).

As described above, the insurance exchange platform may be configured to cause emergency responders to be contacted based on a user confirming that an accident has occurred. In some implementations, and as another example, in a case where the insurance exchange platform determines that a severity of an accident is high, the insurance exchange platform may automatically contact emergency responders without a need for user confirmation. For example, in a case where the insurance exchange platform determines that a severity of an accident is high, the insurance exchange platform may automatically cause emergency responders to be contacted.

In some implementations, the user device and/or the insurance exchange platform may use one or more machine learning algorithms configured to predict the severity of accidents. For example, in some implementations, the user device and/or the insurance exchange platform may provide information regarding various vehicle conditions in one or more accidents as input to one or more machine learning algorithms, which may perform machine learning to automate future determinations or predictions of the severity of accidents. For example, the user device and/or the insurance exchange platform may train a machine learning algorithm based on known inputs (e.g., information regarding vehicle speeds, braking of vehicles, acceleration of vehicles, and/or the like) and known outputs (e.g., information regarding actual severity of accidents). In some implementations, the user device and/or the insurance exchange platform may refine a machine learning algorithm based on feedback received from a user of the user device and/or the insurance exchange platform. For example, the user may provide information indicating whether predictions of the severity of accidents, made by the machine learning algorithm, are accurate and/or helpful. When the information indicates that a particular prediction is accurate and/or helpful, the user device and/or the insurance exchange platform may configure the machine learning algorithm to make predictions of the severity of future accidents based on the particular prediction (e.g., to predict the severity of future accidents in a manner similar to that in which the particular prediction was made). When the information indicates that a particular prediction is not accurate and/or helpful, the user device and/or the insurance exchange platform may configure the machine learning algorithm to avoid predicting the severity of future accidents in a manner in which the particular prediction was made. In this way, the user device and/or the insurance exchange platform may predict the severity of future accidents based on a machine learning algorithm, which improves the accuracy of the predictions, and conserves processor resources and/or storage resources that may otherwise be used to generate and store rules for predicting the severity of accidents. In various implementations, the user device and/or the insurance exchange platform may similarly use one or more machine learning algorithms to predict one or more actions to be taken depending on the severity of an accident (e.g., such as automatically contacting emergency responders, facilitating the exchange of information by displaying the information on a user device, via e-mail, or via text message, and/or the like).

Figure 1C:
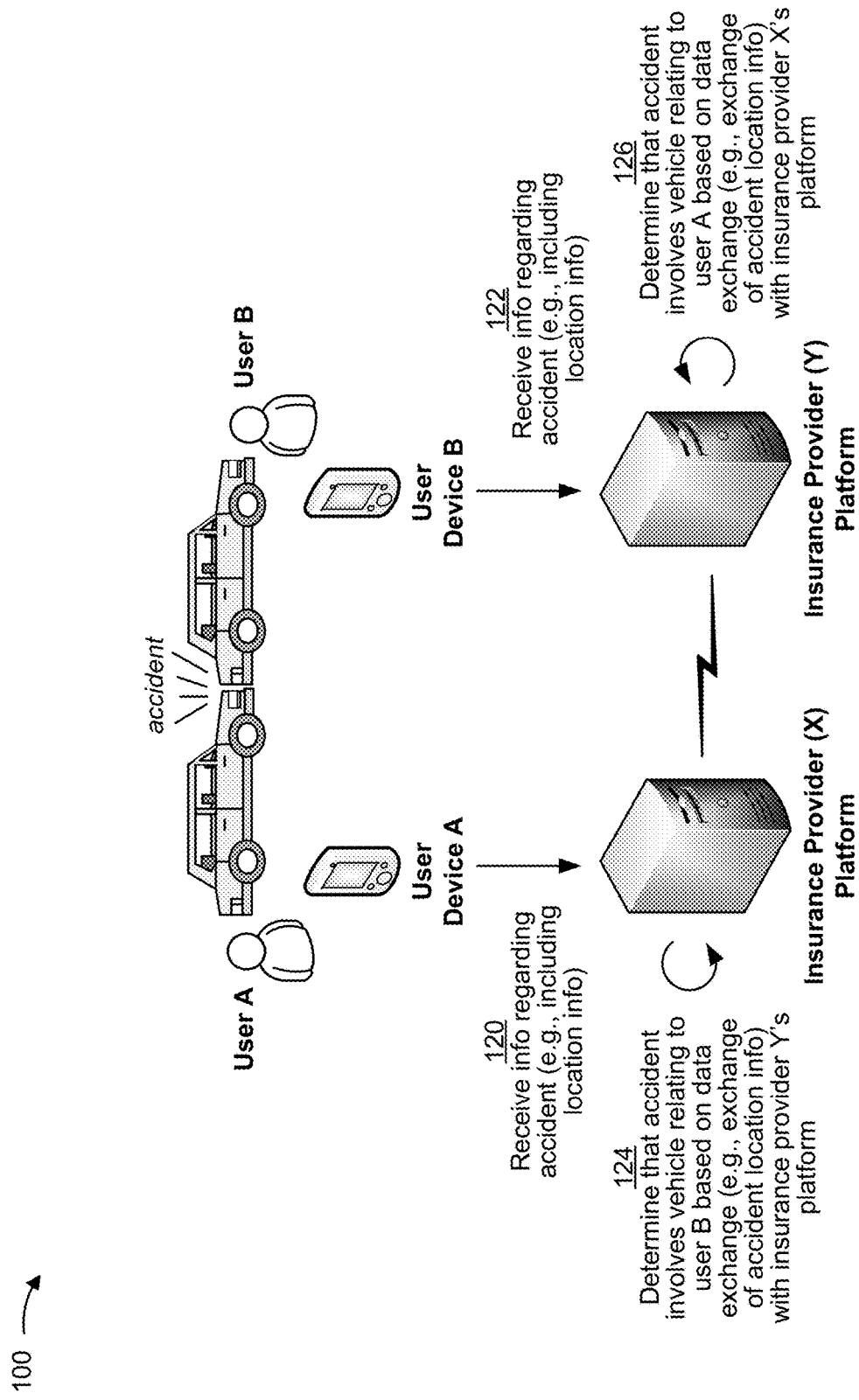
Figure 1D:
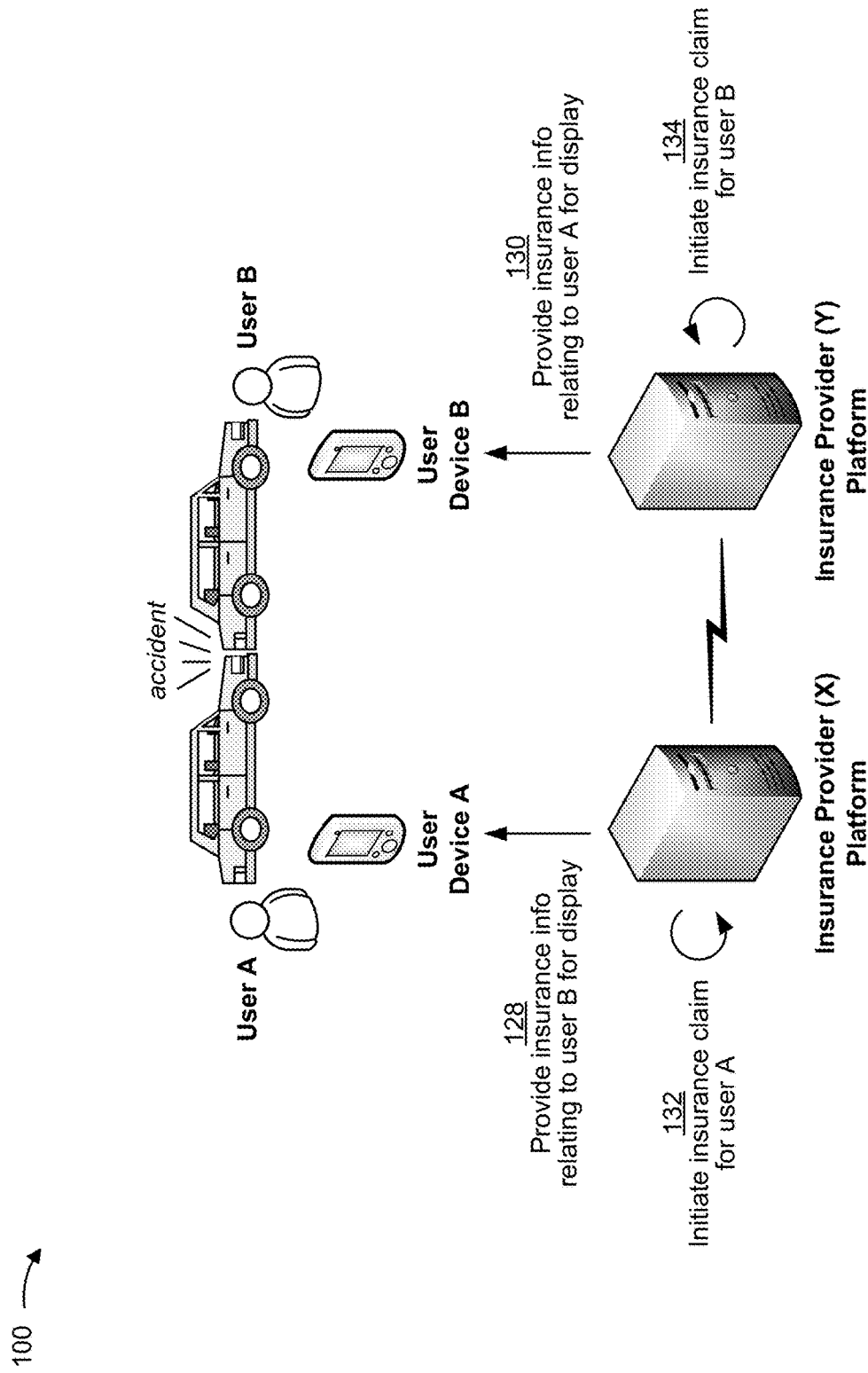

In some implementations, insurance providers may partner with one another to facilitate an exchange of information between respective policyholders involved in an accident. As shown in FIGS. 1C and 1D, user A may have an insurance policy issued by insurance provider X, and user B may have an insurance policy issued by insurance provider Y. Here, insurance provider X and insurance provider Y may each be associated with, or manage, an insurance provider platform (e.g., insurance provider platform X and insurance provider platform Y), and may each provide an application for use by the respective user devices that enables the respective user devices to communicate and/or interact with the respective insurance provider platforms. Although FIGS. 1C and 1D only show two insurance provider platforms (corresponding to two insurance providers), example implementation 100 may include additional insurance provider platforms (corresponding to additional insurance providers).

As shown in FIG. 1C, and as shown by reference number 120, insurance provider platform X may receive (e.g., in real-time, or substantially real-time) information regarding an accident from user device A. As shown by reference number 122, insurance exchange platform Y may receive (e.g., in real-time, or substantially real-time) information regarding an accident from user device B. For example, insurance provider platform X may receive the information regarding the accident, from user device A, via the application provided by insurance provider X, and insurance provider platform Y may receive the information regarding the accident, from user device B, via the application provided by insurance provider Y. Each set of information may be similar to that described above in connection with example implementation 100 of FIGS. 1A and 1B above.

As shown by reference number 124, insurance provider platform X may determine an occurrence of an accident involving vehicles relating to users A and B based on the information received from user device A and based a data exchange with insurance provider platform Y. As shown by reference number 126, insurance provider platform Y may similarly determine an occurrence of an accident involving vehicles relating to users A and B based on the information received from user device B and based on a data exchange with insurance provider platform X In some implementations, each insurance provider platform may, upon or after receiving information regarding an accident from a policyholder, submit a query to one or more other insurance provider platforms to determine if the other insurance provider platform(s) have received information for the same accident. In some implementations, each insurance provider platform may automatically notify one or more of the other insurance provider platform(s) when the insurance provider platform receives information regarding any accident, without a need for the other insurance provider platform(s) to submit any queries. In this way, an insurance provider may identify appropriate counterparty insurance providers that the insurance provider needs to communicate with in order to facilitate an exchange of information for the insurance provider's policyholder.

As shown in FIG. 1D, and as shown by reference number 128, insurance provider platform X may provide user B's information (and/or an associated resource identifier) to user device A for display and/or access. As shown by reference number 130, insurance provider platform Y may similarly provide user A's information (and/or an associated resource identifier) to user device B for display and/or access. For example, insurance provider platform X and insurance provider platform Y may provide such information in a manner similar to that described above in connection with example implementation 100 of FIGS. 1A and 1B. As shown by reference number 132, insurance provider platform X may initiate an insurance claim for user A, and as shown by reference number 134, insurance provider platform Y may similarly initiate an insurance claim for user B (e.g., in a manner similar to that described above in connection with example implementation 100 of FIGS. 1A and 1B).

In this way, the insurance exchange platform may assist a user in obtaining needed information in the event of an accident, which reduces or eliminates a need for the user to know or remember to obtain such information, especially when the user may be experiencing stress or anxiety from the accident. In addition, having a trusted, insurance exchange platform serve as an intermediary between parties to an accident gives confidence to each party that information, such as insurance policy data, obtained regarding the other party is valid and/or up-to-date. This avoids a need for a party to contact law enforcement authorities, to contact the other party's insurance provider, and/or the like to verify the information, which conserves network resources and time.

As indicated above, FIGS. 1A-1D are provided merely as examples. Other examples are possible and may differ from what was described with regard to FIGS. 1A-1D. For example, in some implementations, an application (e.g., the above-mentioned application provided by the trusted entity and/or the like) on a user device may be configured to detect (e.g., after determining that an accident has occurred or has likely occurred) whether nearby user devices (e.g., user devices associated with other parties to an accident), located within a threshold distance from the user device, are equipped with the same application and/or the like, and automatically communicate with such user device(s) to facilitate an exchange of user information (e.g., contact information, insurance policy data, and/or the like). This is particularly beneficial in hit-and-run cases where a party to an accident drives off without exchanging information. Furthermore, although some implementations are described herein as being applicable to the exchange of insurance information in the event of an accident, the implementations (e.g., including the system architecture and techniques thereof) can be equally, or similarly, applied to any situation that may benefit from a trusted exchange of information. Some implementations of the insurance exchange platform, described herein, facilitate an exchange of information based on detection of an accident. In some implementations, the insurance exchange platform may, alternatively, be configured to receive a request from a user to exchange information (e.g., between parties) without needing an accident to occur or to be detected. In some implementations, the information exchange platform, may be configured to receive such user requests in a variety of other use cases (e.g., other than relating to vehicles and/or vehicle accidents).

Figure 2:
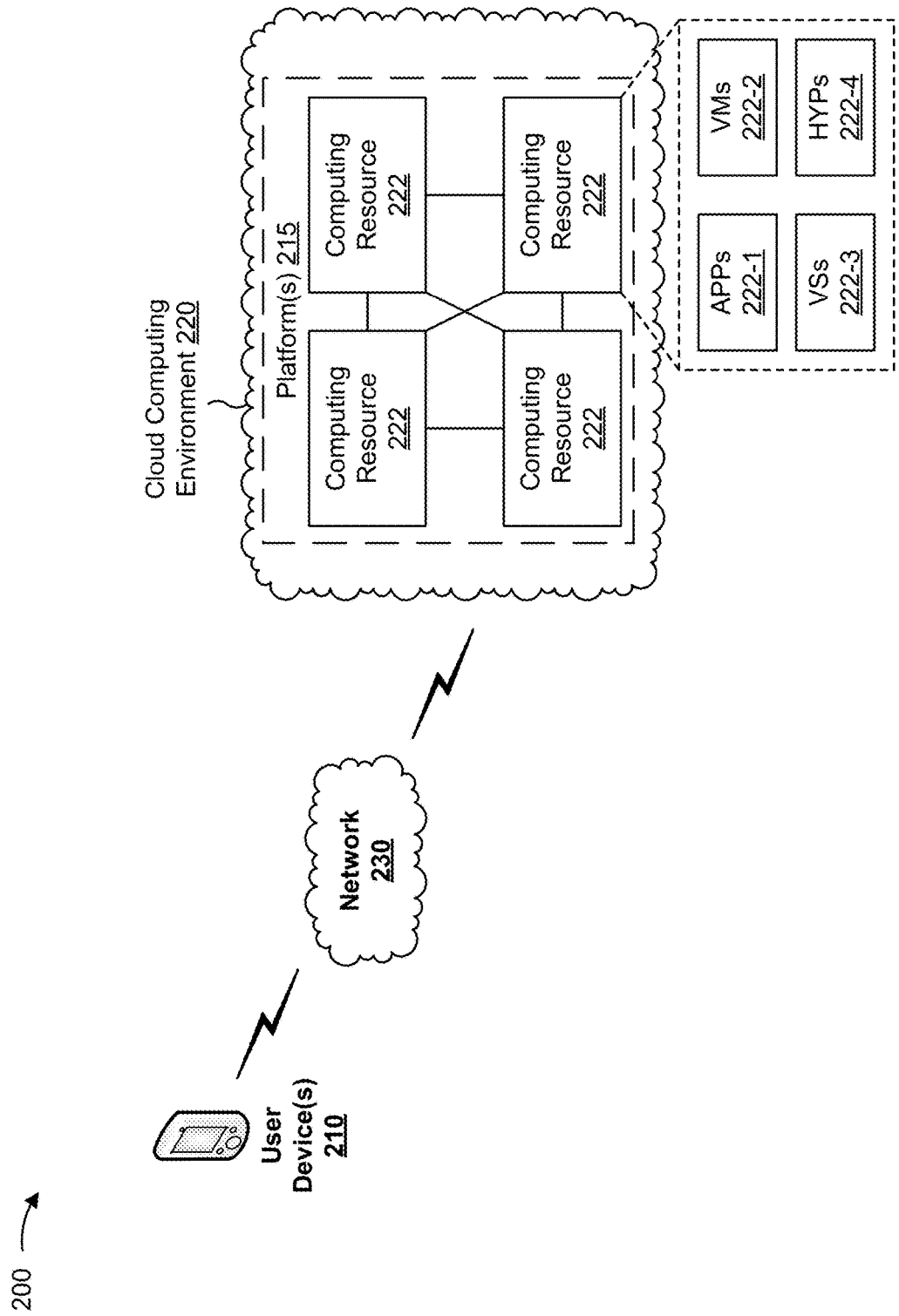
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device(s) 210, platform(s) 215, and a network 230. Devices of environment 200 may interconnect via wired connections, wireless connections, or a combination of wired and wireless connections.

User device 210 includes one or more devices capable of receiving, generating, storing, processing, and/or providing information (e.g., user contact information, insurance policy data, and/or the like) associated with platform(s) 215. For example, user device 210 may include a communication and/or computing device, such as a mobile phone (e.g., a smart phone, a radiotelephone, etc.), a desktop computer, a laptop computer, a tablet computer, a handheld computer, a gaming device, a device integrated within a vehicle, a wearable communication device (e.g., a smart wristwatch, a pair of smart eyeglasses, etc.), or a similar type of device. In some implementations, user device 210 may include one or more motion sensors (e.g., accelerometers, gyroscopes, and/or the like) configured to generate sensor signals based on movements of the user device, and one or more applications configured to analyze the sensor signals (e.g., for movements associated with rapid deceleration, and/or the like) to determine whether an accident has occurred or has likely occurred, and to enable user device 210 to interact with platform 215 (e.g., platform 215 being implemented as an information exchange platform, insurance exchange platform, an insurance provider platform, a third-party platform configured to identify vehicle accidents based on accident-related data provided by user device 210, and/or the like) to facilitate an exchange of information in the event of an accident, as described elsewhere herein.

Platform 215 includes one or more devices capable of receiving, generating, storing, processing, and/or providing information associated with user device 210 and/or one or more other platforms 215. Platform 215 may include a server device or a group of server devices. In some implementations, as shown, platform 215 can be hosted in cloud computing environment 220. Notably, while implementations described herein describe platform 215 as being hosted in cloud computing environment 220, in some implementations, platform 215 is not cloud-based or can be partially cloud-based. In some implementations, platform 215 may be implemented as an information exchange platform, insurance exchange platform, as an insurance provider platform, as a third-party platform configured to identify vehicle accidents based on accident-related data provided by user device 210, and/or the like, as described elsewhere herein. In some implementations, platform 215 may automatically facilitate an exchange of information between parties to an accident.

Cloud computing environment 220 includes an environment that delivers computing as a service, whereby shared resources, services, etc. can be provided to user device 210 and/or one or more other platforms 215. Cloud computing environment 220 can provide computation, software, data access, storage, and/or other services that do not require end-user knowledge of a physical location and configuration of a system and/or a device that delivers the services. As shown, cloud computing environment 220 can include a set of computing resources 222.

Computing resource 222 includes one or more personal computers, workstation computers, server devices, or another type of computation and/or communication device. In some implementations, computing resource 222 can host platform 215. The cloud resources can include compute instances executing in computing resource 222, storage devices provided in computing resource 222, data transfer devices provided by computing resource 222, etc. In some implementations, computing resource 222 can communicate with other computing resources 222 via wired connections, wireless connections, or a combination of wired and wireless connections.

As further shown in FIG. 2, computing resource 222 can include a group of cloud resources, such as one or more applications ("APPs") 222-1, one or more virtual machines ("VMs") 222-2, virtualized storage ("VSs") 222-3, one or more hypervisors ("HYPs") 222-4, and/or the like.

Application 222-1 includes one or more software applications that can be provided to or accessed by user device 210. Application 222-1 can eliminate a need to install and execute the software applications on user device 210. For example, application 222-1 can include software associated with platform 215 and/or any other software capable of being provided via cloud computing environment 220. In some implementations, one application 222-1 can send/receive information to/from one or more other applications 222-1, via virtual machine 222-2.

Virtual machine 222-2 includes a software implementation of a machine (e.g., a computer) that executes programs like a physical machine. Virtual machine 222-2 can be either a system virtual machine or a process virtual machine, depending upon use and degree of correspondence to any real machine by virtual machine 222-2. A system virtual machine can provide a complete system platform that supports execution of a complete operating system (OS). A process virtual machine can execute a single program, and can support a single process. In some implementations, virtual machine 222-2 can execute on behalf of a user (e.g., user device 210) and/or on behalf of one or more other platforms 215, and can manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 can present a virtual operating platform to the guest operating systems, and can manage the execution of the guest operating systems. Multiple instances of a variety of operating systems can share virtualized hardware resources.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
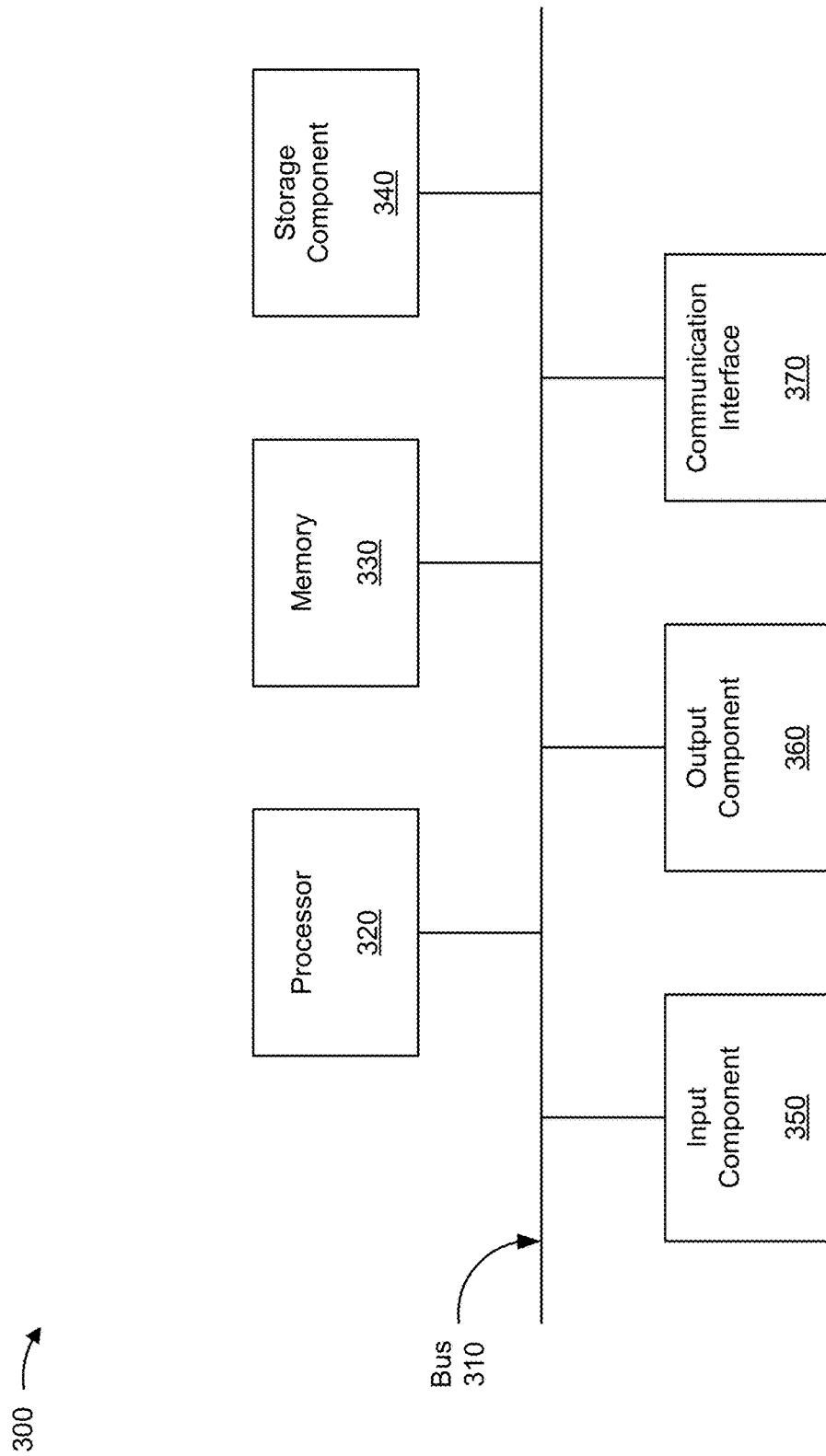
FIG. 3 is a diagram of example components of one or more devices of FIG. 2.

FIG. 3 is a diagram of example components of a device 300. Device 300 may correspond to user device 210 and/or platform 215. In some implementations, user device 210 and/or platform 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
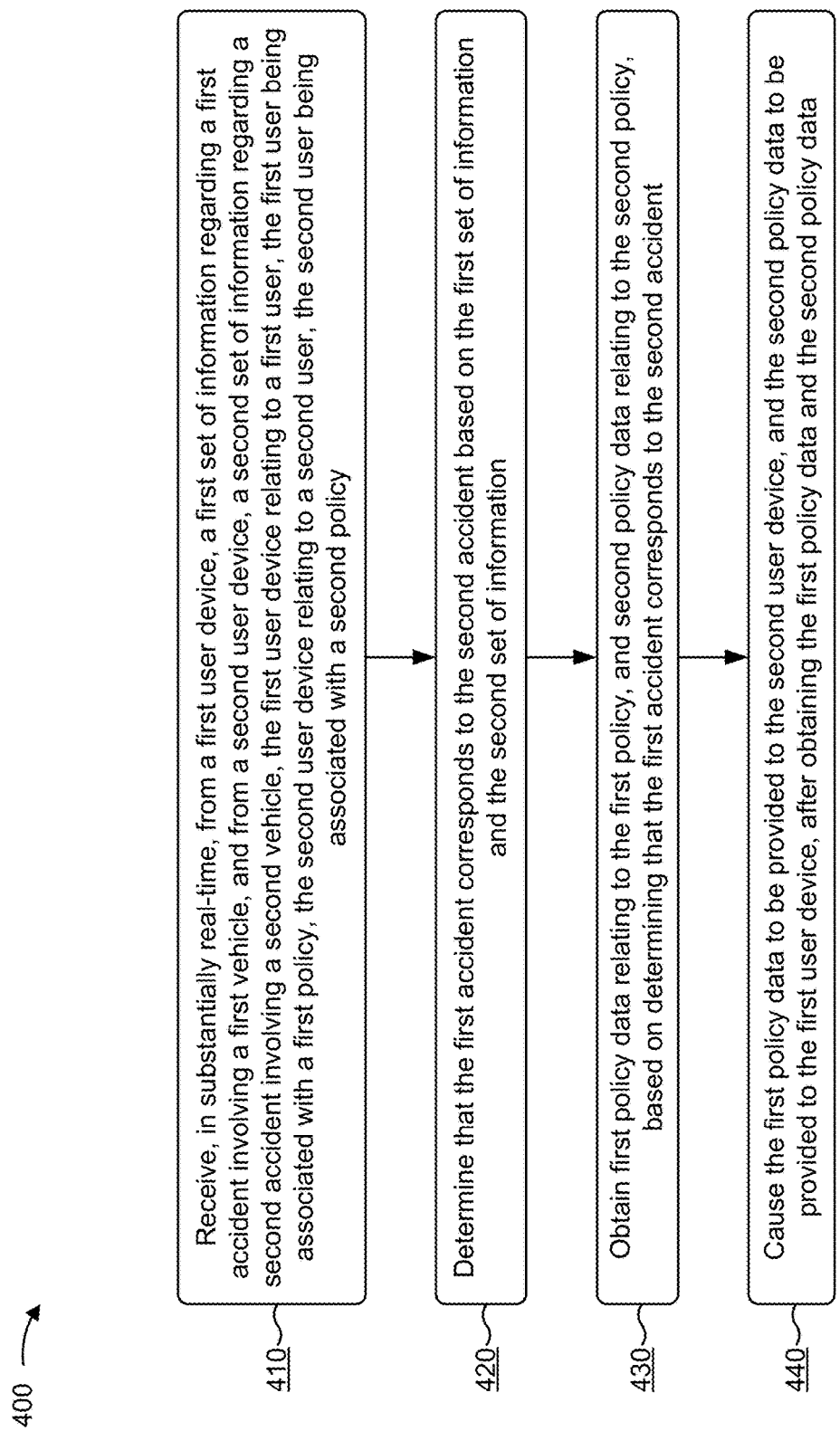
FIG. 4 is a flow chart of an example process for automatically facilitating an exchange of information in the event of an accident.

FIG. 4 is a flow chart of an example process 400 for automatically facilitating an exchange of information in the event of an accident. In some implementations, one or more process blocks of FIG. 4 may be performed by platform 215. In some implementations, one or more process blocks of FIG. 4 may be performed by another device or a group of devices separate from or including platform 215, such as user device 210.

As shown in FIG. 4, process 400 may include receiving, in substantially real-time, from a first user device, a first set of information regarding a first accident involving a first vehicle, and from a second user device, a second set of information regarding a second accident involving a second vehicle (block 410). For example, the platform (e.g., using processor 320, memory 330, storage component 340, input component 350, communication interface 370, and/or the like) may receive, in substantially real-time, from a first user device (e.g., a first user device 210), a first set of information regarding a first accident involving a first vehicle, and from a second user device (e.g., a second user device 210), a second set of information regarding a second accident involving a second vehicle, as described above in connection with FIGS. 1A-1D. In some implementations, the first user device may relate to a first user. In some implementations, the first user may be associated with a first policy. In some implementations, the second user device may relate to a second user. In some implementations, the second user may be associated with a second policy.

As further shown in FIG. 4, process 400 may include determining that the first accident corresponds to the second accident based on the first set of information and the second set of information (block 420). For example, the platform (e.g., using processor 320, memory 330, storage component 340, and/or the like) may determine that the first accident corresponds to the second accident based on the first set of information and the second set of information, as described above in connection with FIGS. 1A-1D.

As further shown in FIG. 4, process 400 may include obtaining first policy data relating to the first policy, and second policy data relating to the second policy, based on determining that the first accident corresponds to the second accident (block 430). For example, the platform (e.g., using processor 320, memory 330, storage component 340, communication interface 370, and/or the like) may obtain first policy data relating to the first policy, and second policy data relating to the second policy, based on determining that the first accident corresponds to the second accident, as described above in connection with FIGS. 1A-1D.

As further shown in FIG. 4, process 400 may include causing the first policy data to be provided to the second user device, and the second policy data to be provided to the first user device, after obtaining the first policy data and the second policy data (block 440). For example, the platform (e.g., using processor 320, memory 330, storage component 340, communication interface 370, and/or the like) may cause the first policy data to be provided to the second user device, and the second policy data to be provided to the first user device, after obtaining the first policy data and the second policy data, as described above in connection with FIGS. 1A-1D.

Process 400 may include additional implementations, such as any single implementation or any combination of implementations described below and/or in connection with one or more other processes described elsewhere herein.

In some implementations, the first policy and the second policy may be issued by a single policy provider. In some implementations, the first user device may include a first instance of an application provided by the single policy provider, and the second user device may include a second instance of the application. In some implementations, receiving the first set of information and the second set of information may include receiving the first set of information from the first instance of the application, and the second set of information from the second instance of the application.

In some implementations, the first policy may be issued by a first policy provider, and the second policy may be issued by a second policy provider that is different than the first policy provider. In some implementations, the first user device may include a first application provided by the first policy provider, and the second user device may include a second application provided by the second policy provider. In some implementations, receiving the first set of information and the second set of information may include receiving the first set of information from the first application, and the second set of information from the second application.

In some implementations, the first policy and the second policy may be issued by a single policy provider. In some implementations, obtaining the first policy data and the second policy data may include obtaining the first policy data and the second policy data from the single policy provider.

In some implementations, the first policy may be issued by a first policy provider, and the second policy may be issued by a second policy provider that is different than the first policy provider. In some implementations, obtaining the first policy data and the second policy data may include obtaining the first policy data from the first policy provider, and the second policy data from the second policy provider.

In some implementations, obtaining the first policy data and the second policy data may include obtaining the first policy data and the second policy data using one or more application programming interface (API) calls. In some implementations, obtaining the first policy data and the second policy data may include obtaining the first policy data and the second policy data using one or more access tokens.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
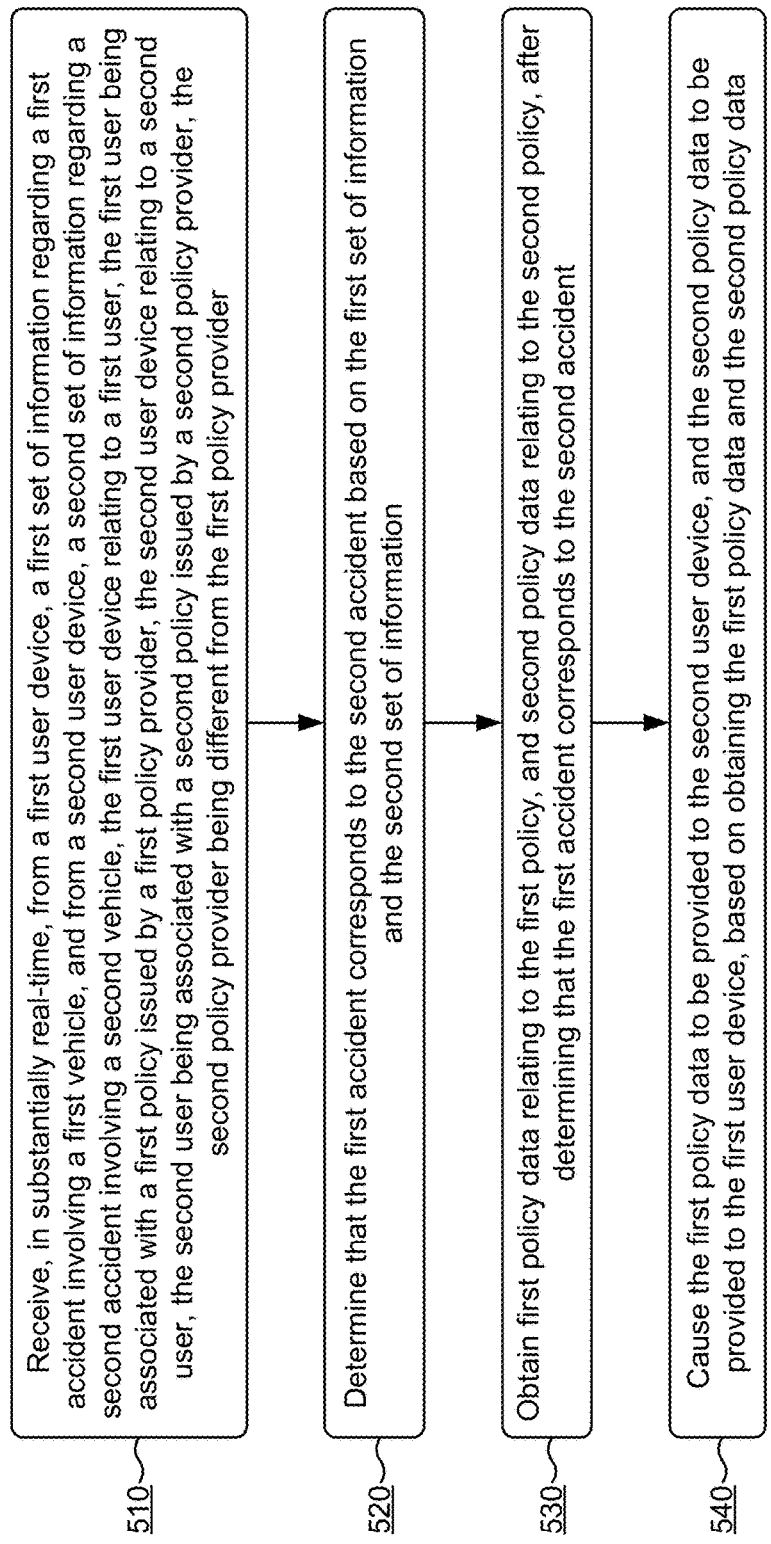
FIG. 5 is a flow chart of an example process for automatically facilitating an exchange of information in the event of an accident.

FIG. 5 is a flow chart of an example process 500 for automatically facilitating an exchange of information in the event of an accident. In some implementations, one or more process blocks of FIG. 5 may be performed by platform 215. In some implementations, one or more process blocks of FIG. 5 may be performed by another device or a group of devices separate from or including platform 215, such as user device 210. In some implementations, a server device (e.g., platform 215) may include one or more memories, and one or more processors, communicatively coupled to the one or more memories, configured to perform process 500.

As shown in FIG. 5, process 500 may include receiving, in substantially real-time, from a first user device, a first set of information regarding a first accident involving a first vehicle, and from a second user device, a second set of information regarding a second accident involving a second vehicle (block 510). For example, the platform (e.g., using processor 320, memory 330, storage component 340, input component 350, communication interface 370, and/or the like) may receive, in substantially real-time, from a first user device (e.g., a first user device 210), a first set of information regarding a first accident involving a first vehicle, and from a second user device (e.g., a second user device 210), a second set of information regarding a second accident involving a second vehicle, as described above in connection with FIGS. 1A-1D. In some implementations, the first user device may relate to a first user. In some implementations, the first user may be associated with a first policy issued by a first policy provider. In some implementations, the second user device may relate to a second user. In some implementations, the second user may be associated with a second policy issued by a second policy provider. In some implementations, the second policy provider may be different from the first policy provider.

As further shown in FIG. 5, process 500 may include determining that the first accident corresponds to the second accident based on the first set of information and the second set of information (block 520). For example, the platform (e.g., using processor 320, memory 330, storage component 340, and/or the like) may determine that the first accident corresponds to the second accident based on the first set of information and the second set of information, as described above in connection with FIGS. 1A-1D.

As further shown in FIG. 5, process 500 may include obtaining first policy data relating to the first policy, and second policy data relating to the second policy, after determining that the first accident corresponds to the second accident (block 530). For example, the platform (e.g., using processor 320, memory 330, storage component 340, communication interface 370, and/or the like) may obtain first policy data relating to the first policy, and second policy data relating to the second policy, after determining that the first accident corresponds to the second accident, as described above in connection with FIGS. 1A-1D.

As further shown in FIG. 5, process 500 may include causing the first policy data to be provided to the second user device, and the second policy data to be provided to the first user device, based on obtaining the first policy data and the second policy data (block 540). For example, the platform (e.g., using processor 320, memory 330, storage component 340, communication interface 370, and/or the like) may cause the first policy data to be provided to the second user device, and the second policy data to be provided to the first user device, based on obtaining the first policy data and the second policy data, as described above in connection with FIGS. 1A-1D.

Process 500 may include additional implementations, such as any single implementation or any combination of implementations described below and/or in connection with one or more other processes described elsewhere herein.

In some implementations, the server device may be managed by an information exchange service provider. In some implementations, the first user device may include a first instance of an application provided by the information exchange service provider, and the second user device may include a second instance of the application. In some implementations, the one or more processors, when receiving the first set of information and the second set of information, may be configured to receive the first set of information from the first instance of the application, and the second set of information from the second instance of the application.

In some implementations, the first user device may include a first instance of a third-party application, and the second user device may include a second instance of the third-party application. In some implementations, the one or more processors, when receiving the first set of information and the second set of information, may be configured to receive the first set of information from the first instance of the third-party application, and the second set of information from the second instance of the third-party application. In some implementations, the third-party application may include a map-based application, or a traffic-based application.

In some implementations, the first user device may include a first third-party application, and the second user device may include a second third-party application that is different from the first third-party application. In some implementations, the one or more processors, when receiving the first set of information and the second set of information, may be configured to receive the first set of information from the first third-party application, and the second set of information from the second third-party application.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
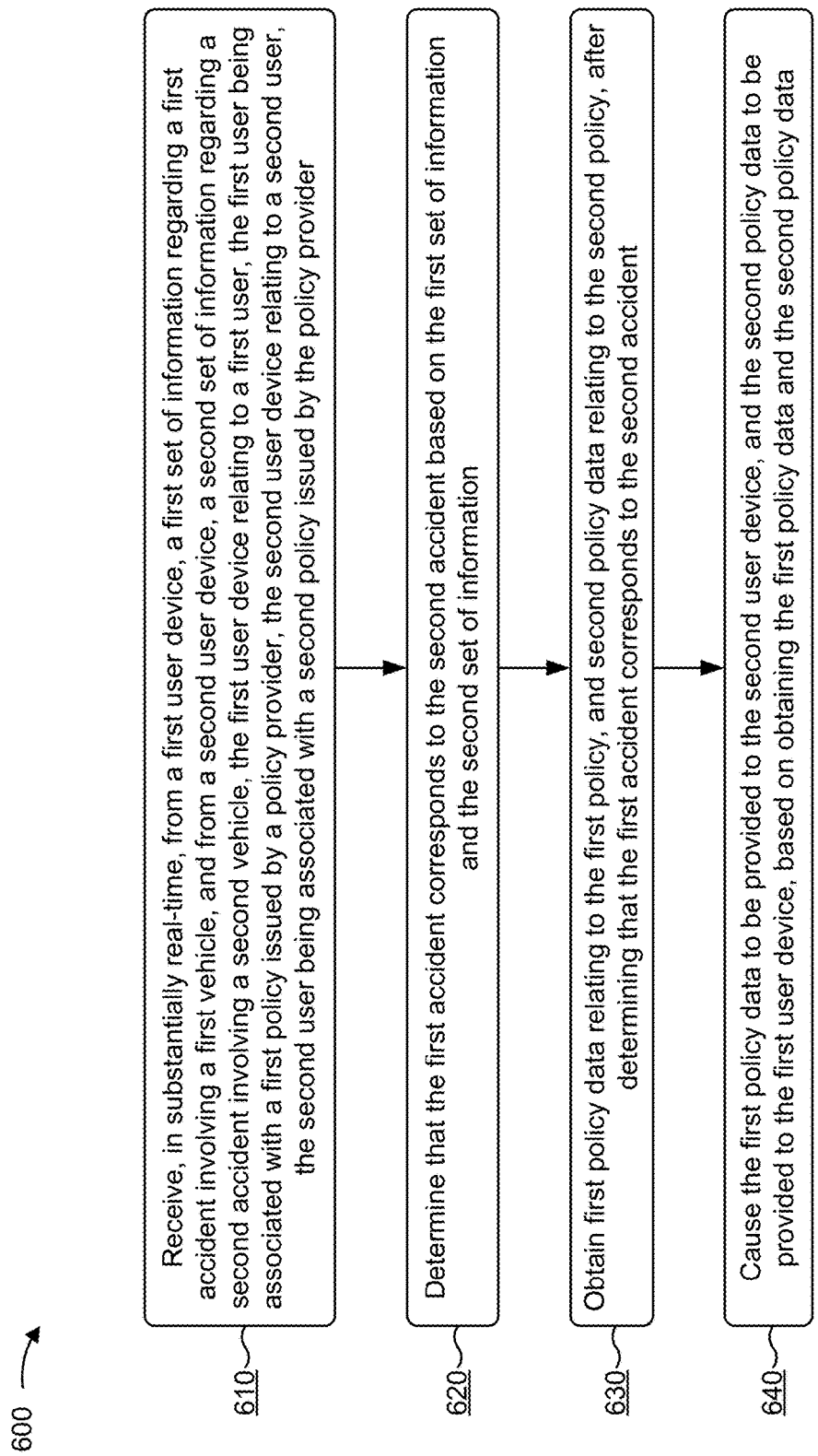
FIG. 6 is a flow chart of an example process for automatically facilitating an exchange of information in the event of an accident.

FIG. 6 is a flow chart of an example process 600 for automatically facilitating an exchange of information in the event of an accident. In some implementations, one or more process blocks of FIG. 6 may be performed by platform 215. In some implementations, one or more process blocks of FIG. 6 may be performed by another device or a group of devices separate from or including platform 215, such as user device 210. In some implementations, a non-transitory computer-readable medium may store instructions. In some implementations, the instructions may include one or more instructions that, when executed by one or more processors of a server device (e.g., platform 215), cause the one or more processors to perform process 600.

As shown in FIG. 6, process 600 may include receiving, in substantially real-time, from a first user device, a first set of information regarding a first accident involving a first vehicle, and from a second user device, a second set of information regarding a second accident involving a second vehicle (block 610). For example, the platform (e.g., using processor 320, memory 330, storage component 340, input component 350, communication interface 370, and/or the like) may receive, in substantially real-time, from a first user device (e.g., a first user device 210), a first set of information regarding a first accident involving a first vehicle, and from a second user device (e.g., a second user device 210), a second set of information regarding a second accident involving a second vehicle, as described above in connection with FIGS. 1A-1D. In some implementations, the first user device may relate to a first user. In some implementations, the first user may be associated with a first policy issued by a policy provider. In some implementations, the second user device may relate to a second user. In some implementations, the second user may be associated with a second policy issued by the policy provider.

As further shown in FIG. 6, process 600 may include determining that the first accident corresponds to the second accident based on the first set of information and the second set of information (block 620). For example, the platform (e.g., using processor 320, memory 330, storage component 340, and/or the like) may determine that the first accident corresponds to the second accident based on the first set of information and the second set of information, as described above in connection with FIGS. 1A-1D.

As further shown in FIG. 6, process 600 may include obtaining first policy data relating to the first policy, and second policy data relating to the second policy, after determining that the first accident corresponds to the second accident (block 630). For example, the platform (e.g., using processor 320, memory 330, storage component 340, communication interface 370, and/or the like) may obtain first policy data relating to the first policy, and second policy data relating to the second policy, after determining that the first accident corresponds to the second accident, as described above in connection with FIGS. 1A-1D.

As further shown in FIG. 6, process 600 may include causing the first policy data to be provided to the second user device, and the second policy data to be provided to the first user device, based on obtaining the first policy data and the second policy data (block 640). For example, the platform (e.g., using processor 320, memory 330, storage component 340, communication interface 370, and/or the like) may cause the first policy data to be provided to the second user device, and the second policy data to be provided to the first user device, based on obtaining the first policy data and the second policy data, as described above in connection with FIGS. 1A-1D.

Process 600 may include additional implementations, such as any single implementation or any combination of implementations described below and/or in connection with one or more other processes described elsewhere herein.

In some implementations, the one or more instructions, that cause the one or more processors to obtain the first policy data and the second policy data, may cause the one or more processors to obtain the first policy data from the first user device, and the second policy data from the second user device.

In some implementations, the one or more instructions, that cause the one or more processors to obtain the first policy data and the second policy data, may cause the one or more processors to obtain the first policy data and the second policy data from prestored data sets in memory on the server device.

In some implementations, the first set of information may include first location data regarding a location of the first accident, and the second set of information may include second location data regarding a location of the second accident. In some implementations, the one or more instructions, that cause the one or more processors to determine that the first accident corresponds to the second accident, may cause the one or more processors to determine that the first accident corresponds to the second accident based on the first location data and the second location data.

In some implementations, the one or more instructions, that cause the one or more processors to receive the first set of information and the second set of information, may cause the one or more processors to receive the first set of information based on a detection of data concerning the first accident by a motion sensor of the first user device, and receive the second set of information based on a detection of data concerning the second accident by a motion sensor of the second user device.

In some implementations, the one or more instructions, that cause the one or more processors to cause the first policy data to be provided to the second user device, and the second policy data to be provided to the first user device, may cause the one or more processors to cause only a portion of the first policy data, that is needed to initiate a claim for the second user, to be provided to the second user device, and only a portion of the second policy data, that is needed to initiate a claim for the first user, to be provided to the first user device.

In some implementations, the one or more instructions, when executed by the one or more processors, may further cause the one or more processors to command the first user device and/or the second user device to prompt the first user and/or the second user to provide additional accident-related information, and cause a claim to be initiated for the first user and/or a claim to be initiated for the second user based on the additional accident-related information. In some implementations, the additional accident-related information may include a police report.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations, described herein, provide a platform 215 that is capable of automatically facilitating an exchange of information (e.g., personal information, vehicle information, insurance policy data, and/or the like) between parties involved in an accident, such as a vehicle collision. In some implementations, platform 215 may automatically initiate the exchange of information based on data (e.g., motion sensor data) provided by one or more user devices (e.g., user device(s) 210) of those involved in the accident. In some implementations, platform 215 may interact with multiple devices, including, for example, user devices 210 and other platform(s) 215, such as server devices associated with insurance policy providers, server devices associated with third-party service providers, and/or the like, to determine whether an accident has occurred, to obtain insurance policy data associated with each of the parties, to perform the exchange of information, and/or to initiate insurance claims for one or more of the parties.

In this way, the insurance exchange platform may assist a user in obtaining needed information in the event of an accident, which reduces or eliminates a need for the user to know or remember to obtain such information, especially when the user may be experiencing stress or anxiety from the accident. In addition, having a trusted, insurance exchange platform serve as an intermediary between parties to an accident gives confidence to each party that information, such as insurance policy data, obtained regarding the other party is valid and/or up-to-date. This avoids a need for a party to contact law enforcement authorities, to contact the other party's insurance provider, and/or the like to verify the information, which conserves network resources and time.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
   receiving, by a server device and from a first user device, a first set of information regarding a first accident involving a first vehicle, and from a second user device, a second set of information regarding a second accident involving a second vehicle,
      the first user device relating to a first user,
         the first user device being different than the first vehicle and including a first instance of an application,
         the first user being associated with a first policy, and
         the server device receiving the first set of information when the first user device detects the first accident based on analyzing first sensor signals from first sensors included in the first user device,
      the second user device relating to a second user,
         the second user device being different than the second vehicle and including a second instance of the application,
         the second user being associated with a second policy, and
         the server device receiving the second set of information when the second user device detects the second accident based on analyzing second sensor signals from second sensors included in the second user device;
   determining, by the server device, that the first accident corresponds to the second accident based on the first set of information received from the first user device and the second set of information received from the second user device;
   determining, by the server device, a predicted severity of the first accident and the second accident using one or more machine learning algorithms;
   performing, by the server device, one or more actions to be taken based on the predicted severity of the first accident and the second accident;
   obtaining, by the server device, first policy data relating to the first policy, and second policy data relating to the second policy, based on determining that the first accident corresponds to the second accident;
   requesting, by the server device and to the first user device, permission to share the first policy data with the second user device;
   requesting, by the server device and to the second user device, permission to share the second policy data with the first user device;
   encoding, by the server device, the first policy data and the second policy data based on receiving permission from the first user device to share the first policy data;
   causing, by the server device, the encoded first policy data to be provided to the first user device, and the encoded second policy data to be provided to the second user device, after encoding the first policy data and the second policy data,
      where causing the encoded first policy data and the encoded second policy data to be provided includes:
         providing a first quick response (QR) code to the first user device to access the encoded first policy data shareable with the second user device, and
         providing a second QR code to the second user device usable to access the encoded second policy data shareable with the first user device.

2. The method of claim 1, wherein the first policy and the second policy are issued by a single policy provider;
   wherein the first instance of the application is provided by the single policy provider; and
   wherein receiving the first set of information and the second set of information comprises:
      receiving the first set of information from the first instance of the application, and the second set of information from the second instance of the application.

3. The method of claim 1, wherein the first policy is issued by a first policy provider, and the second policy is issued by a second policy provider that is different than the first policy provider;
   wherein the first user device includes the first instance of the application provided by the first policy provider, and
   the second user device includes the second instance of the application provided by the second policy provider.

4. The method of claim 1, wherein the first policy and the second policy are issued by a single policy provider; and
   wherein obtaining the first policy data and the second policy data comprises:
      obtaining the first policy data and the second policy data from the single policy provider.

5. The method of claim 1, wherein the first policy is issued by a first policy provider, and the second policy is issued by a second policy provider that is different than the first policy provider; and
   wherein obtaining the first policy data and the second policy data comprises:
      obtaining the first policy data from the first policy provider, and the second policy data from the second policy provider.

6. The method of claim 1, wherein obtaining the first policy data and the second policy data comprises:
   obtaining the first policy data and the second policy data using one or more application programming interface (API) calls.

7. The method of claim 1, wherein obtaining the first policy data and the second policy data comprises:

obtaining the first policy data and the second policy data using one or more access tokens.

8. A server device, comprising:
one or more memories; and
one or more processors, communicatively coupled to the one or more memories, configured to:
receive, from a first user device, a first set of information regarding a first accident involving a first vehicle, and from a second user device, a second set of information regarding a second accident involving a second vehicle,
the first user device relating to a first user,
the first user device being different than the first vehicle and including a first instance of an application,
the first user being associated with a first policy issued by a first policy provider, and
the server device receiving the first set of information when the first user device detects the first accident based on analyzing first sensor signals from first sensors included in the first user device,
the second user device relating to a second user,
the second user device being different than the second vehicle and including a second instance of the application,
the second user being associated with a second policy issued by a second policy provider, and
the server device receiving the second set of information when the second user device detects the second accident based on analyzing second sensor signals from second sensors included in the second user device,
the second policy provider being different from the first policy provider;
determine that the first accident corresponds to the second accident based on the first set of information received from the first user device and the second set of information received from the second user device;
obtain first policy data relating to the first policy, and second policy data relating to the second policy, after determining that the first accident corresponds to the second accident;
request, to the first user device, permission to share the first policy data with the second user device;
request, to the second user device, permission to share the second policy data with the first user device;
encode the first policy data and the second policy data based on receiving permission from the first user device to share the first policy data; and
cause the encoded first policy data to be provided to the first user device, and the encoded second policy data to be provided to the second user device, based on encoding the first policy data and the second policy data,
where the one or more processors, when causing the encoded first policy data and the encoded second policy data to be provided, are to:
provide a first quick response (QR) code to the first user device to access the encoded first policy data shareable with the second user device, and
provide a second QR code to the second user device to access the encoded second policy data sharable with the first user device.

9. The server device of claim 8, wherein the server device is managed by an information exchange service provider;
wherein the first instance of the application is provided by the information exchange service provider; and
wherein the one or more processors, when receiving the first set of information and the second set of information, are configured to:
receive the first set of information from the first instance of the application, and the second set of information from the second instance of the application.

10. The server device of claim 8, wherein the first instance of the application includes a third-party application, and the second instance of the application includes the third-party application; and
wherein the one or more processors, when receiving the first set of information and the second set of information, are configured to:
receive the first set of information from the first instance of the third-party application, and the second set of information from the second instance of the third-party application.

11. The server device of claim 10, wherein the third-party application includes:
a map-based application, or
a traffic-based application.

12. The server device of claim 8, wherein the first user device includes a first third-party application, and the second user device includes a second third-party application that is different from the first third-party application; and
wherein the one or more processors, when receiving the first set of information and the second set of information, are configured to:
receive the first set of information from the first third-party application, and the second set of information from the second third-party application.

13. A non-transitory computer-readable medium storing instructions, the instructions comprising:
one or more instructions that, when executed by one or more processors of a server device, cause the one or more processors to:
receive, from a first user device, a first set of information regarding a first accident involving a first vehicle, and from a second user device, a second set of information regarding a second accident involving a second vehicle,
the first user device relating to a first user,
the first user device being different than the first vehicle and including a first instance of an application,
the first user being associated with a first policy issued by a policy provider, and
the server device receiving the first set of information when the first user device detects the first accident based on analyzing first sensor signals from first sensors included in the first user device,
the second user device relating to a second user,
the second user device being different than the second vehicle and including a second instance of the application,
the second user being associated with a second policy issued by the policy provider,
the server device receiving the second set of information when the second user device detects the second accident based on analyzing second sensor signals from second sensors included in the second user device;
determine that the first accident corresponds to the second accident based on the first set of information received from the first user device and the second set of information received from the second user device;

determine a predicted severity of the first accident and the second accident using one or more machine learning algorithms;

perform one or more actions to be taken based on the predicted severity of the first accident and the second accident;

obtain first policy data relating to the first policy, and second policy data relating to the second policy, after determining that the first accident corresponds to the second accident;

request, to the first user device, permission to share the first policy data with the second user device;

request, to the second user device, permission to share the second policy data with the first user device;

encode the first policy data and the second policy data based on receiving permission from the first user device to share the first policy data; and cause the encoded first policy data to be provided to the first user device, and the encoded second policy data to be provided to the second user device, based on encoding the first policy data and the second policy data, where the one or more instructions, that cause the one or more processors to cause the encoded first policy data and the encoded second policy data to be provided, cause the one or more processors to:

provide a first quick response (QR) code to the first user device to access the encoded first policy data sharable with the second user device, and provide a second QR code to the second user device to access the encoded second policy data sharable with the first user device.

14. The non-transitory computer-readable medium of claim 13, wherein the one or more instructions, that cause the one or more processors to obtain the first policy data and the second policy data, cause the one or more processors to:

obtain the first policy data from the first user device, and the second policy data from the second user device.

15. The non-transitory computer-readable medium of claim 13, wherein the one or more instructions, that cause the one or more processors to obtain the first policy data and the second policy data, cause the one or more processors to:

obtain the first policy data and the second policy data from prestored data sets in memory on the server device.

16. The non-transitory computer-readable medium of claim 13, wherein the first set of information includes first location data regarding a location of the first accident, and the second set of information includes second location data regarding a location of the second accident; and wherein the one or more instructions, that cause the one or more processors to determine that the first accident corresponds to the second accident, cause the one or more processors to:

determine that the first accident corresponds to the second accident based on the first location data and the second location data.

17. The non-transitory computer-readable medium of claim 13, wherein the first sensors included in the first user device include a first motion sensor;

wherein the second sensors included in the second user device include a second motion sensor; and wherein the one or more instructions, that cause the one or more processors to receive the first set of information and the second set of information, cause the one or more processors to:

receive the first set of information based on a detection of data concerning the first accident by the first motion sensor; and receive the second set of information based on a detection of data concerning the second accident by the second motion sensor.

18. The non-transitory computer-readable medium of claim 13, wherein the one or more instructions, that cause the one or more processors to cause the first policy data to be provided to the second user device, and the second policy data to be provided to the first user device, cause the one or more processors to:

cause only a portion of the first policy data, that is needed to initiate a claim for the second user, to be provided to the second user device, and only a portion of the second policy data, that is needed to initiate a claim for the first user, to be provided to the first user device.

19. The non-transitory computer-readable medium of claim 13, wherein the one or more instructions, when executed by the one or more processors, further cause the one or more processors to:

command the first user device and/or the second user device to prompt the first user and/or the second user to provide additional accident-related information; and cause a claim to be initiated for the first user and/or a claim to be initiated for the second user based on the additional accident-related information.

20. The non-transitory computer-readable medium of claim 19, wherein the additional accident-related information includes a police report.

* * * * *